June 26, 1945.  W. P. LEAR  2,379,363
AIRCRAFT RADIO LOCALIZER SYSTEM
Filed Nov. 27, 1939  6 Sheets-Sheet 6

INVENTOR.
William P. Lear
BY Richard A. Marsen
ATTORNEY.

Patented June 26, 1945

2,379,363

UNITED STATES PATENT OFFICE 2,379,363

AIRCRAFT RADIO LOCALIZER SYSTEM

William P. Lear, Dayton, Ohio, assignor, by mesne assignments, to Lear, Incorporated, Piqua, Ohio, a corporation of Illinois Application November 27, 1939, Serial No. 306,315

9 Claims. (Cl. 250—11)

This invention relates to radio guidance systems for mobile craft and more particularly relates to novel radio blind approach systems and methods for guiding an aircraft to a landing runway, a marine vessel into a slip, and the like. This case is a continuation-in-part of my copending application, Serial Number 291,807, filed August 25, 1939, entitled "Radio guidance system."

Radio direction finders have made it possible to guide an aircraft or ship directly to the vicinity of a radio transmitting station at its destination. During adverse weather conditions such as rain, fog or snow, it is impractical to land the aircraft or vessel without further aid. The so-called equi-signal runway localizing beacon was developed about 1930 for guiding an aircraft to a landing runway. In this system directional transmission of radio energy is concentrated along the approach to the runway. Upon locating the equi-signal path, the pilot must keep on the approach to the runway.

Various forms of the runway equi-signal localizer system have since been carried out in practice. The pilot arrives in the vicinity of the airport using a radio compass or flying on a leg of a radio range beacon. On reaching the transmitter station, as denoted by a cessation of the radio signal, he maneuvers in a predetermined manner in order to locate the equi-signal localizing beacon. It is necessary for him to fly in the narrow path of the beacon. This often results in weaving and loss of the beacon. Marker beacons are employed at one or more points along the equi-signal path to apprise the pilot of his distance from the runway.

It is generally relatively difficult to locate the equi-signal beacon, and it is also difficult to stay on it for any reasonable distance due to wind currents and drift. The system is inflexible as to direction of arrival, and no determinations are afforded the pilot of his position with respect to the airport in general. Descent to the runway is performed with a radio glide path for vertical guidance, or by reliance on a sensitive altimeter.

A different radio approach system was developed in 1934 by Hegenberger and adopted by the U. S. Army Air Corps. The Hegenberger system employs two spaced radio transmitter stations, each radiating an independent non-directional radio wave as well as an ultra short wave vertical marker beacon signal. The two stations are mobile and placed in line with the desired direction of approach. The pilot uses an ordinary radio loop compass, such as a right-left indicator, and also a marker beacon indicator.

For approaching the vicinity of the airport the pilot tunes the right-left compass to one of the transmitter stations and flies directly towards it. He is informed of his arrival over that station by the marker beacon indicator. He then quickly tunes his right-left indicator to the second transmitter station and flies directly towards that, knowing of his arrival thereover by a marker beacon indication. The pilot in this manner makes several trial flights along the line of approach between the two transmitter stations, and adjusts a directional gyroscope to compensate for drift.

In his maneuvers, the pilot using the Hegenberger system is required to quickly change the tuning of his radio compass between one and the other of the two radio stations as he passes over them several times. In order to ascertain his position with respect to the runway, the busy pilot must use his judgment and interpret his several maneuvers as well as the readings of several trial approaches before he is reasonably sure of his position and direction prior to gliding down to the runway. For descent, this system makes use of a sensitive altimeter. Drifting off the course is not directly apparent from the radio system, hence the reliance on the directional gyroscope.

In accordance with my present invention I provide a radio blind approach system which avoids the shortcomings of the prior systems. The system of the invention continuously indicates to the pilot his exact relative lateral position with respect to the airport in general, and his exact position with respect to the approach path to the runway. Two spaced non-directional transmitters are placed in line with the desired runway. The receiver system is simultaneously tuned to both transmitters and has two needle indicators arranged to continuously and independently point out the direction to each of the transmitters. The pilot is thus continually made aware of his position. No study or interpretation of the indications is necessary. No training period is required since the meaning of the indications is apparent almost by intuition.

With the system of my invention, the pilot may approach the runway directly on the shortest route and without any trial flight since he clearly knows his orientation with respect to the airport and runway course. The two indicator needles of the receiver are in line with the center-zero index when the pilot is on-course with the runway. As he passes over the outer transmitter, the "out" indicator needle reverses by 180°. This serves as a marker indication to apprise him of his exact distance from the edge of the runway. As the pilot continues on-course to the runway, the second or "in" needle will reverse by 180° when he passes over the inner transmitter station. No separate marker beacons are thus necessary. The pilot is then ready to glide down to a landing using any suitable vertical guidance means.

Drifting from the predetermined approach course is accurately detected through the dual indicator readings, and is readily compensated for by the pilot. No reliance on directional gyroscopes or other flight instruments is necessary. The results are foolproof and independent of adverse weather conditions. There are no successive receiver tuning changes or other distracting duties required of the pilot with the system of my invention. After the initial tuning operation, the dual indicator arrangement is continually effective in guiding the pilot in the manner set forth.

In accordance with some forms of the present invention, the two ground transmitter stations have different radio frequencies and continuously radiate non-directionally. Two rotatable directional antennae aboard the aircraft separately receive the radio signals, and are automatically controlled by a receiver system to maintain a predetermined null signal or bearing position with respect to the ground stations. An indicator with a needle coupled to each loop antenna gives continuous lateral guidance of the aircraft with respect to the airport and runway. In one form which my invention assumes in practice, two separate automatic radio direction indicators, one tuned to each of the ground stations, are used with a composite indicator having a separate needle continuously controlled by each direction finder.

To conserve bulk and weight of receiver equipment required aboard the aircraft in practicing my invention, I provide novel arrangements combining major sections of the two separate automatic direction finders into a single circuit. Two separate radio frequency tuning units are used, individually tunable to the frequencies of the two ground stations. In one embodiment, a continuously operating switching means is arranged between the two tuning units and the common amplifier system, successively connecting each tuning unit to the amplifier at a predetermined rate to maintain the individual loop antennae and associated indicators in bearing relationship with corresponding transmitters. The switching action is initiated in the receiver and may be performed mechanically or electronically. The switching action, in a modification, is accomplished by an intermittent tone modulation on one of the ground transmitters.

In another form of the invention, both radio frequency tuning units are permanently connected to a single amplifier circuit. The two ground stations are modulated with different predetermined audio frequency tones. The modulated radio frequency waves are received by the corresponding tuning units. Means are provided for segregating the signal components due to the radio frequency waves and their associated modulations to effect resultant control signals and proper control actions on the associated rotatable antennae and respective indicators. In a further form of the invention, I provide two audio frequency signals locally controlling the radio signals received separately by the two tuning units. After amplification through a common circuit, the components are segregated as separate control signals for the two directional antennae. The directional indications by the latter systems are continuously operative, and continuously effect accurate lateral guidance indications.

The present invention is applicable for guiding a marine vessel into its slip, such as during fog conditions. In this case, the two radio transmitters are placed on land in line with the direction which the vessel is to enter the slip. The pilot employs the same approach equipment described in connection with the aircraft guidance and is accurately guided into the slip despite river current or zero visibility conditions. Anti-collision devices can be used for safety reasons when there is sole reliance on the radio guidance in docking the vessel.

It is accordingly an object of my present invention to provide novel methods of and means for radio approach guidance of mobile craft to a predetermined line of destination.

Another object of my present invention is to provide a novel lateral position radio indication method and system comprising two separate directional indicators.

Still another object of the invention is to provide a novel radio lateral position indicator system continuously effective in apprising the pilot of his exact relative position with respect to two spaced transmitter stations.

A further object of the present invention is to provide a novel radio guidance system employing two separate radio frequency tuning units and a common amplifier circuit and control arrangement.

Still a further object of the present invention is to provide a novel radio guidance system employing two radio frequency tuning units and a common intermediate frequency and audio frequency amplifier system therefor with means for effecting successive connection between the tuning units and the amplifier.

Another object of the present invention is to provide a novel radio guidance system employing a plurality of directional antennae and associated radio frequency tuning units together with a common amplifier system and circuit means operative through a plurality of audio frequency signals for effecting continuous operation of the whole system.

These and further objects of the present invention will become apparent in the following description of exemplifications thereof shown in the following drawings, in which.

*Aircraft guidance method*

Figure 1:
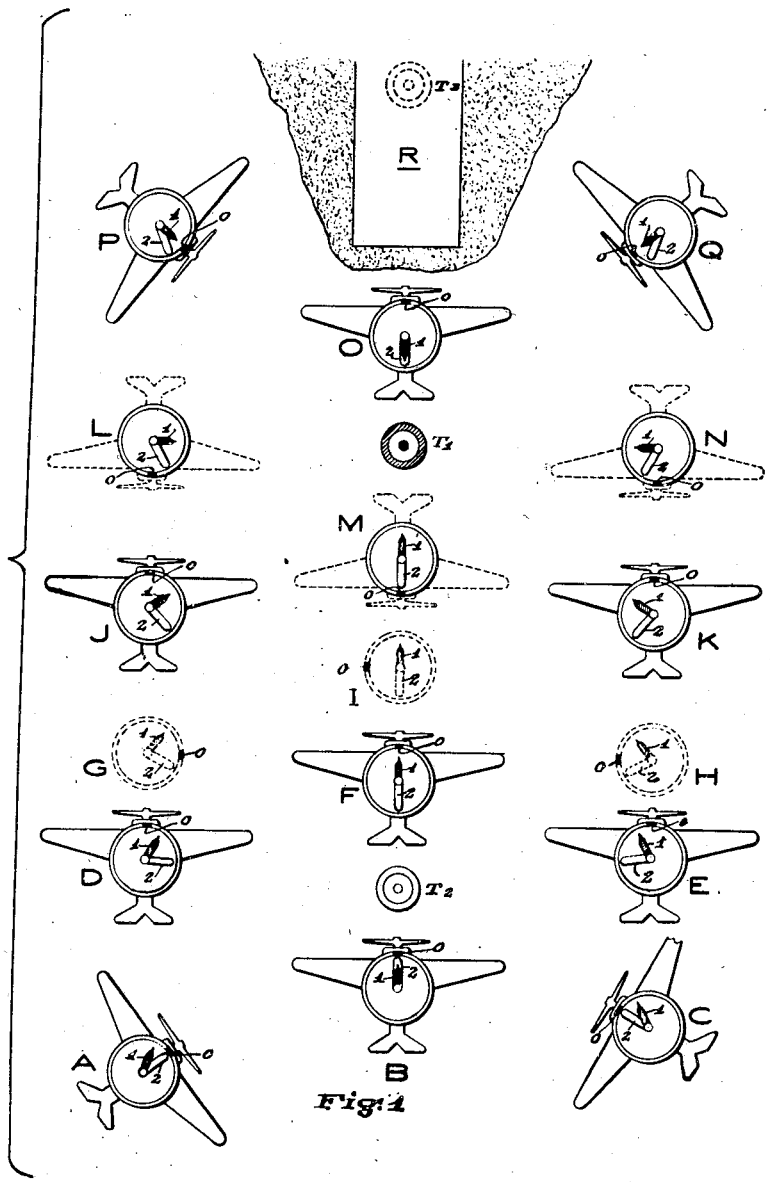
Fig. 1 is a diagram illustrating the operation of the radio guidance system in connection with the approach of an aircraft to its runway.

Fig. 1 is a diagrammatic showing of the application of the present invention for guiding an aircraft to a landing runway R. $T_1$ and $T_2$ are transmitter stations aligned with the runway R chosen for the landing of the aircraft. Station $T_1$ may be positioned about a half mile from the edge of the runway and station $T_2$ spaced about four miles from station $T_1$. The spacing of transmitters $T_1$ and $T_2$ from runway R is optional, but is preferably prearranged in practical application. A receiver for the signals from stations $T_1$ and $T_2$ is aboard the aircraft, and indicator needles 1 and 2 are automatically controlled by the receiver to point towards the respective transmitter stations.

Needle 1, corresponding to the "in" position, is arranged to point towards transmitter $T_1$. Needle 2, the "out" needle, is arranged to point towards transmitter $T_2$. The operation of the transmitter and receiver systems, to be described in detail hereinafter, is such that needles 1 and 2 individually point to their respective stations $T_1$ and $T_2$, and give an accurate indication, without directional ambiguity, to these stations. A zero index 0 on the indicator dial may well correspond to the longitudinal or axial position of the aircraft, being the direction of flight of the aircraft with no cross-winds.

Referring to position A of the aircraft, which is behind the outer station $T_2$, and towards the left of it, we note that "out" needle 2 pointing towards $T_2$ and "in" needle 1 pointing towards $T_1$ give a rapidly comprehended indication of the plane's lateral position. A pilot at position A notes that both stations $T_1$ and $T_2$ are ahead and that he is heading directly towards $T_2$ and towards station $T_1$, from the left of the approach path $T_1$—$T_2$. As he moves towards the right, for example to position B, needle 1 moves into the index 0 position.

At position B, which is in line with the runway and transmitter $T_1$ and $T_2$, both needles 1 and 2 are on-course and point to index 0. If the aircraft were approaching the field from position C which is behind the transmitters and to the right thereof, the pilot quickly notes his relative lateral position by the orientation of needles 1 and 2 with respect to the zero-center index. In position C, needle 1 is deflected towards the right of needle 2 indicating the relative position of the plane towards $T_1$ and runway R.

At position D, the aircraft is at the left side of transmitter $T_2$ as ascertained by the near 90° position of needle 2, and the position of needle 1 to the right of index 0. When the aircraft is at the right side of station $T_2$, such as at position E, the indication of needles 1 and 2 thereat readily signifies this fact. If the pilot is in alignment with the runway or is otherwise on-course, "out" needle 2 reverses by 180° as he passes over station $T_2$. Position F shows the "out" needle 2 in the 180° position, and needle 1 at the 0° position. The pilot then knows that he is properly heading on-course and is between transmitters $T_1$ and $T_2$, having just passed station $T_2$.

At position G shown in dotted, the aircraft is heading transverse to the on-course direction as denoted by the position of index 0 corresponding to the flight direction of the aircraft. Needles 1 and 2 point towards transmitters $T_1$ and $T_2$ practically in the orientation of adjacent position D. The general orientation of needles 1 and 2 at D and G apprises the pilot that he is somewhere between stations $T_1$ and $T_2$ and to the left of the approach path between them. The index 0 at position G, lying between needles 1 and 2 apprises him that he is heading directly towards the approach path $T_1$—$T_2$ rather than along the path as at position D. Similarly dotted position H indicates that the aircraft is heading towards the approach path from the right.

Index 0 as well as indicator needles 1 and 2 coact to apprise the pilot of his relative lateral position, as well as direction, with respect to the required radio course. The pilot, with negligible consideration or interpretation immediately realizes how to maneuver his plane to arrive at the proper path and correct attitude. At position I, the plane lies on the approach path, needles 1 and 2 being 180° apart as they are at position F. However, the direction of flight of the plane at I is transverse to the on-course path as denoted by index 0. At position I, the reading of needle 1 on the scale is 90°, and needle 2 is 270°. At position F however, needle 1 reads 0° and needle 2 reads 180°, corresponding to the on-course position between stations $T_1$ and $T_2$.

At position J, the aircraft is intermediate between stations $T_1$ and $T_2$ and clearly to the left of the on-course path between them. The position of index 0 at J informs the pilot that he is heading in a general direction from station $T_2$ towards station $T_1$, and that he is to the left of the approach path $T_1$—$T_2$. Symmetrical position K to the right of the path has a similar indication to J, with needles 1 and 2 both showing that stations $T_1$ and $T_2$ are to the left of the direction of flight indicated by index 0.

The dotted position of the aircraft at L indicates a reverse flight direction. By observing that "in" needle 1 points to his left and that "out" needle 2 points nearer to index 0, the pilot knows that he is flying generally towards outer station $T_2$ and accordingly will have to reverse his direction of flight to approach runway R. At dotted position M, the pilot is on the approach path $T_1$—$T_2$ and between stations $T_1$ and $T_2$ as denoted by a 180° displacement of needles 1 and 2. However, since "out" needle 2 points towards index 0, and "in" needle 1 to the 180° scale position, the pilot realizes that he is flying in a direction away from the runway even though he is on-course. At dotted position N which is symmetrical with position L, the pilot similarly ascertains that he is flying generally away from the runway and is to the right side of it.

The interpretation of the indications by index 0 and needles 1 and 2 are natural and readily comprehended to any pilot without a study or training period. The meaning of any reading is apparent to him practically by intuition. No unnecessary maneuvering with respect to stations $T_1$ and $T_2$ is required with the system of my invention. As the pilot approaches the vicinity of the airport from any direction he can, by the lateral position indications, ascertain exactly how to maneuver his plane to reach head position B which is on-course with the runway and behind outer transmitter $T_2$.

Should the pilot approach the airfield from position A or C he will known that he is properly behind transmitter $T_2$ and need merely direct his plane nearer to the right or left as the case may be to reach the approach path position indicated to him by an indicator reading as at B. Similarly, should the pilot approach the airfield from the rear as from position P or Q, the relative indications of needles 1 and 2 with respect to the index 0 will inform him that he is nearer transmitter $T_1$ than transmitter $T_2$; that he is flying generally in a direction away from the runway; and that he should continue flying until he is beyond station $T_2$ and reverse his flight direction in order to reach position B at the head of the approach path.

Should the pilot arrive at the airport in a direction transverse to approach path $T_1$—$T_2$, it will be readily apparent to him. Positions G and H, for example, indicate such direction of arrival. The orientation of needles 1 and 2, on opposite sides of index 0, apprises the pilot that he is somewhere between stations $T_1$ and $T_2$ and approaching towards the path between them from the left or right side as the case may be. Should he approach the path from position H, a 180° displacement of the needles 1 and 2 when he reaches position I informs him that he is crossing the approach path $T_1$—$T_2$. From the indications, the pilot can readily tell the most direct manner in which to maneuver his aircraft towards head-on position B for approaching runway R.

In accordance with the invention, the two radio transmitters $T_1$ and $T_2$ are arranged in line with the approach path to the chosen runway R upon which the aircraft is to descend. The inner station $T_1$ is spaced a predetermined distance from the edge of runway R, for example, 500 feet or a half mile. The outer transmitter $T_2$ is spaced a predetermined distance from station $T_1$, say 4 or 5 miles. In view of the fact that in my system marker indications are given the pilot when the aircraft passes over either station $T_1$ or $T_2$, predetermined spacing from the edge of the runway R is a marked advantage in practice. The pilot is thus given a clear indication of his position prior to landing and is assisted in properly maneuvering for descent to the runway. As hereinabove explained, the relative indications between needles 1 and 2 and index 0 give the pilot a clear aspect of his lateral position with respect to the airport, stations $T_1$ and $T_2$ and runway R, enabling him to directly maneuver his aircraft to head-on position B behind outer transmitter $T_2$ in preparation for an approach to the runway.

With my system, the pilot thus quickly determines his lateral position and attitude from any direction of approach, and moves to head-on position D where needles 1 and 2 both point to index 0 if there is no cross-wind or drift and the attitude of the aircraft is on-course. The pilot then continues flying along path $T_1$—$T_2$. As he passes over station $T_2$ "out" needle 2 reverses by 180°, the needles assuming the 180° displacement such as shown at F. The pilot knows that he then is at the predetermined distance of station $T_2$ from the runway, and is properly on-course. The flight is continued towards $T_1$. As soon as the pilot passes over station $T_1$, the "in" needle 1 reverses its indication by 180° and reads as shown at position 0. The pilot then knows that he is the predetermined distance of $T_1$ from the edge of runway R, and is in line with the runway.

An important feature of my system resides in the accurate appraisal of drift of the mobile craft in its movement along the predetermined on-course path. Whenever needles 1 and 2 are 180° apart such as shown at positions F, I and M, or aligned and 0° apart such as at positions B and 0, the craft is directly on-course. As long as the pilot is flying along path $T_1$—$T_2$ needles 1 and 2 are either zero or 180° apart. Cross-wind or wrong attitude of the aircraft tending to move it off path $T_1$—$T_2$ is readily made apparent by a corresponding change in the 0° or 180° displacement of needles $T_1$ and $T_2$. The concentric mounting of needles $T_1$ and $T_2$ and accurate bearing indications affords a sensitive drift indication, since needle displacements of even 1° are easily read. It is to be noted that the on-course indications by the 0° or 180° needle displacements are independent of the position of index 0 with respect to needles 1 and 2. The relative position of index 0 with respect to needles 1 and 2 gives the relative position of the axis of the aircraft in its movement along the path $T_1$—$T_2$.

In utilizing this significant characteristic of the system, the pilot can readily and accurately adjust his controls to keep the plane on-course despite variable or unknown drift due to cross-winds and the like. It is merely necessary for him to jockey or otherwise crab the aircraft on path $T_1$—$T_2$ and maintain nedles 1 and 2 zero or 180° apart to insure his arrival to runway R in the exact predetermined direction as determined by stations $T_1$ and $T_2$. As he passes over station $T_2$, "out" needle 2 reverses 180° from its showing at position B to that at position F, without affecting the drift indications noted, yet serving as an accurate marker indication of the distance of the aircraft from the edge of runway R. Similarly, as the aircraft passes over station $T_1$ to position such as at 0, "in" needle 1 reverses to the 180° position and is in alignment with reversed needle 2, still sensitive to any drift indications and serving as a marker indication of the aircraft with respect to the edge of runway R.

Descent to the runway may then be effected by any suitable method. A general method employs a sensitive altimeter. The pilot brings the aircraft to a predetermined altitude when he, for example, reaches over station $T_1$ prior to his descent. A preferred method of descent to the runway R is one employing a third transmitter station, such as $T_3$, of horizontally polarized waves in conjunction with a receiver having a loop antenna rotatable about its horizontal axis and the orientation of which is automatically controlled by the directional receiver unit resulting in a straight line glide path indication direct to the landing field. The angle of the descent path to the landing field is optional and is determined by the altitude of the aircraft prior to the descent.

Figure 2:
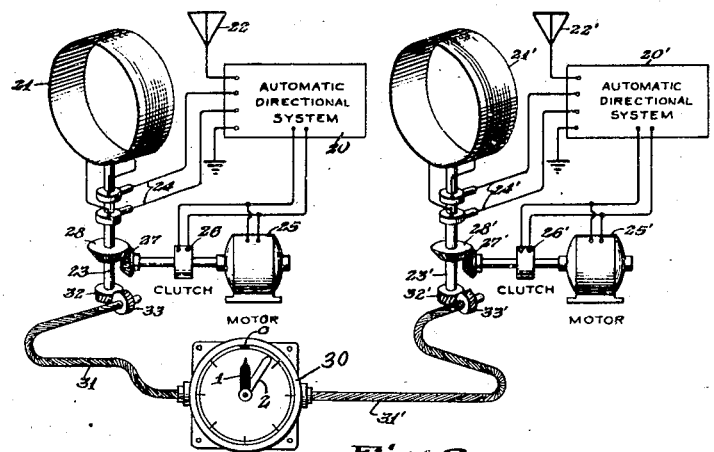
Fig. 2 is a schematic diagram illustrating one form which my invention may assume in practice, comprising two separate automatic direction receiver units.
Figure 3:
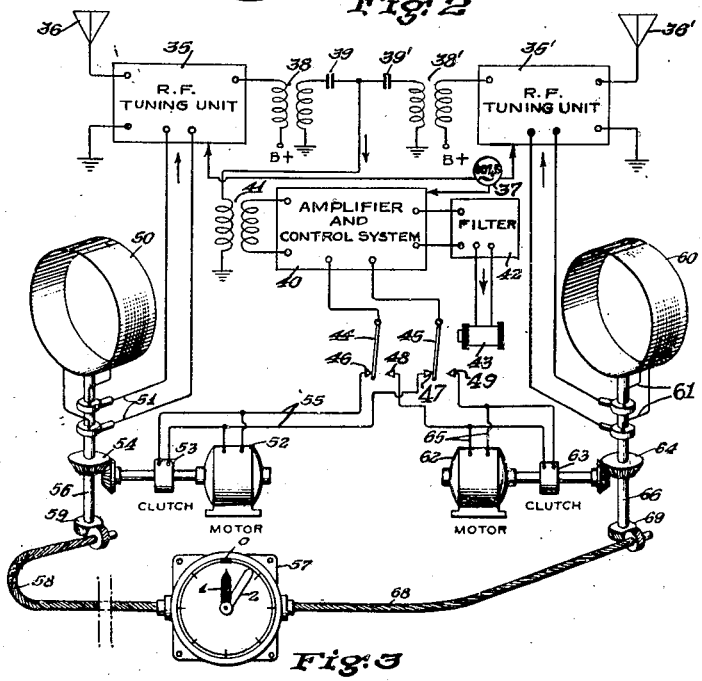
Fig. 3 is another form of the radio guidance system, employing two separate radio-frequency tuning units and a common amplifier and control system automatically switched into synchronous circuit relation with two rotatable directional antenna drive units.

Transmitters $T_1$ and $T_2$ may well be independent of each other and transmit separate radio frequency waves. The present case is primarily directed towards receiver systems used in connection with independent radio transmitters. In my copending application, Serial Number 291,807 hereinabove referred to, several receiver systems are disclosed wherein a single radio carrier wave frequency is used for both transmitters $T_1$ and $T_2$, and which transmitters are synchronously switched on and off at a predetermined rate. Figs. 3 and 5 of the present case operates with such transmitters. The other receiver systems described are used in conjunction with continuously operated transmitters T₁ and T₂ each using different radio carrier wave frequencies. Two separate receiver units are employed in the system of Fig. 2, wherein a composite indicator arrangement is used. The systems of Figs. 3, 4, 6 and 7 employ two separate radio frequency tuners, one corresponding to each transmitter T₁ and T₂, and a common intermediate frequency amplifier-detector-audio frequency amplifier arrangement for both.

*Localizer receiver systems*

Two separate automatic directional receivers having individual indicators, or a combined system employing a modified single automatic receiver unit may be employed in carrying out my invention. Fig. 2 shows an arrangement using two separate automatic directional receivers, each corresponding to an automatic 360° radio directional indicator such as for example disclosed in my copending application, "Automatic radio direction indicator," Serial Number 286,733 filed July 27, 1939, now Patent No. 2,308,521, issued January 19, 1943. The directional control receiver units 20, 20' of the system each have an associated rotatable loop antenna 21 and 21', as well as non-directional antennae 22 and 22' respectively.

Loop antennae 21, 21' are rotatably mounted upon their respective shafts 23 and 23', and are connected to receivers 20 and 21' through slip rings and connections 24 and 24'. Both directional systems 20 and 20' are individually and simultaneously tuned to the field transmitters T₁ and T₂. System 20, for example, may be made responsive to the radio signals emanating only from transmitter T₁ while system 20' is made responsive to signals from transmitter T₂. The loop motor 25 connected to output of control system 20 drives loop shaft 23 through an electromagnetic clutch 26 and gearing 27, 28.

As described in my Patent No. 2,308,521, the orientation of loop antenna 21 is automatically brought to the null signal position with respect to the oncoming radio signals from the transmitter it is responsive to, namely station T₁ in the present case. Motor 25 is a reversible motor which brings loop antenna 21 in the predetermined null signal position without directional ambiguity. A remote indicator 30 is coupled to loop shaft 23 so that its needle 1 continually indicates the actual angular position of loop antenna 21. A flexible mechanical cable 31 interconnects remotely placed meter 30 with loop shaft 23 through coacting gearing 32, 33, shown as spiral gears. An electrical telemetering system may instead be used.

In a similar manner the radio signals emanating from transmitter T₂ controls directional unit 20' to operate motor 25' to rotate loop shaft 23' through clutch 26' and gearing 27', 28' to bring loop antenna 21' in the predetermined null signal position with respect to the signals from the transmitter T₂. The common indicator 30 is mechanically coupled to loop shaft 23' through flexible cable 31' and coacting spiral gears 32', 33'. The position of needle 2 depends upon the angular position of loop antenna 21' and a continuous indication of the position of loop 21' is accordingly effected at the remote position such as in the cockpit of the aircraft.

The directional accuracy of the bearings by needles 1 and 2 on the respective transmitter stations T₁ and T₂ is preferably designed to be accurate to within 1° of arc. An automatic 360° directional indicator unit such as described in my Patent No. 2,308,521, already referred to, provides such accuracy. Such accurate dual directional bearings combine to provide a reliable drift indication for the approach course which is extremely useful in aircraft landing during adverse weather conditions. The indicator needles may be combined in a common housing with their shafts concentric, as shown. Alternatively two separate meters may be used, one for each indicator needle, with the meters held close together. It is to be understood that quadrantal compensators may be employed between the loop antennae and the respective indicator needles to compensate for metallic masses and unequal radio field distribution about the structure of the vehicle.

Reduction in weight, bulk and cost of the receiver equipment may be effected by employing a common intermediate frequency-detector-audio frequency-and-control circuit for the automatic directional systems corresponding to 20, 20' of Fig. 2. Fig. 3 is a schematic diagrammatic showing of one form which such combined arrangement may assume in practice. Two separate radio frequency tuning units 35, 35' having individual non-directional antennae 36, 36' are both connected to a common amplifier control unit 40. A directional antenna 50, rotatable through 360°, is connected to radio frequency tuning unit 35 through slip rings and connection leads 51. A second rotatable directional antenna 60 is similarly connected to the input of radio frequency tuning unit 35' through connection leads 61.

For the receiver system of Fig. 3, transmitters T₁ and T₂ may have the same or different carrier frequency waves. One of the stations however is modulated by a predetermined audio frequency tone. If their frequencies are different they may be arranged to radiate continuously. In this case the tone modulation on the one carrier is effected intermittently, say at successive intervals of one-third to one-half of a second. When, however, the same carrier wave frequency is used for both transmitters, the modulation is continuous on the one transmitter but the stations are successively switched on and off at intervals, for example of one-third to one-half of a second in a manner similar to that described in my copending application, Serial Number 291,807 particularly in connection with Figs. 4, 5 and 6 therein, and in my copending application Serial No. 495,978, filed July 24, 1943, for "Direction radio transmitting system." The modulating tone is used to effect the automatic switching of the unitary amplifier and control system 40 for connection with the respective loop antennae systems 50 and 60. The modulating frequency may be 75 cycles, 150 cycles, 300 cycles or the like.

Loop antennae 50 and 60 are continuously connected to their corresponding radio frequency tuning units 35 and 35'. A local audio frequency or tone generator 37 is suitably connected with tuning units 35, 35' as well as to amplifier control system 40. Generator 37 produces an alternating current signal of a predetermined frequency, such as 102.5 cycles. This signal is combined with the radio frequency tuning units and the control system in a predetermined manner to effect a proper action on the motor drive units for the loop antennae 50 and 60. The action of the local generator 37 on the circuit is similar to that as fully described in my copending application, Serial Number 291,807 and my Patent No. 2,308,521, and as will be explained in more detail hereinafter.

The output of radio frequency tuning unit 35 is at the predetermined intermediate frequency, for example 455 kilocycles. The output of unit 35 is connected to intermediate frequency transformer 38, the secondary of which is coupled through coupling condenser 39 to intermediate frequency transformer 41 connected to amplifier system 40. The output of radio frequency tuning unit 35' is similarly connected to intermediate frequency transformer 41 through transformer 38' and coupling condenser 39'. Amplifier and control system 40 comprises the common intermediate frequency amplifier, detector, audio frequency amplifier and electronic relay control system similar to corresponding components of a single automatic radio direction indicator unit disclosed in the Patent No. 2,308,521.

However, in the system of Fig. 3, the original tone modulation on one of the received radio frequency carrier waves is filtered out by filter 42 suitably connected to system 40. The signal is passed at proper strength for energizing solenoid 43. Solenoid 43 is arranged to actuate armatures 44 and 45 connected to the control output of system 40. Armatures 44, 45 are normally in the position illustrated connecting with contacts 46, 47 and the motor drive for rotatable antenna system 50. When solenoid 43 is energized during the reception of the modulated one of the radio frequency waves, for example that corresponding to transmitter T₂ and the reception thereof by tuning unit 35', armatures 44, 45 are attracted to the right, disconnecting with contacts 46, 47 and connecting with contacts 48, 49. The motor drive for rotatable loop antenna system 60 is accordingly connected to control system 40 when solenoid 43 is energized during tone modulation reception periods.

Loop antenna 50 is rotatable through 360°. Its actual position is directly controlled by reversible electric motor 52 mechanically coupled with loop antenna 50 through electro-magnetic clutch 53 and gearing 54. Motor 52 and its associated magnetic clutch 53 are connected with relay contacts 46, 47 through connection leads 55. When relay solenoid 53 is unenergized, armatures 44, 45 are in the illustrated (left) position, connecting the output of control system 40 thereto. During this interval, corresponding to the radiation of one of the transmitters, say T₁, and its reception by tuning unit 35, motor 52 is controlled by system 40 to motivate loop antenna 50 into the null signal position with respect to the direction towards the transmitter T₁. Loop shaft 56 is connected to indicator 57 through flexible cable 58 and gearing arrangement 59. The angular position of needle 1 of indicator 57 is directly controlled by the movement of loop antenna 50, continuously pointing out the position of loop 50 which corresponds to the direction towards transmitter T₁.

The second transmitter T₂ is, in the present case, received by non-directional antenna 36' and rotatable loop antenna 60 and tuned-in by tuning unit 35'. A corresponding loop antenna control signal emerges from the output of system 40 for antenna 60. During this interval solenoid 43 is energized through filter unit 42. Filter unit 42 may well contain a rectifier if a direct current type of solenoid is preferred at 43. Energization of solenoid 43 causes armatures 44, 45 to connect with contacts 48, 49. This action connects reversible motor drive 62 to control system 40 through leads 65, and also connects magnetic clutch 63 thereto for engagement of loop 60 with the motor.

Motor 62 controls the orientation of loop antenna 60, driving it through electromagnetic clutch 63 and reduction gearing 64. During the radiation interval of station T₂, in the present case, loop antenna 60 is moved to the null signal position with respect to the direction towards this station. The orientation of loop antenna 60 is transmitted to needle 2 of meter 57 through flexible cable 68 connected to loop shaft 66 through gearing arrangement 69.

In the system of Fig. 3, loop antennae 50 and 60 are successively moved by their associated control motors 52 and 62 to the corresponding null signal positions towards transmitters T₁ and T₂, pointing out the direction thereto within 1° of arc. Lateral position indication of the vehicle or aircraft is thus effected with respect to stations T₁ and T₂ and the field. Indicator needles 1 and 2 point out the absolute direction towards stations T₁ and T₂ over a 360° scale. The position of needles 1 and 2 with respect to the zero index apprises the pilot of his lateral position with respect to the landing field in a manner already described in connection with Fig. 1. The system of Fig. 3 is employed where the ground stations have either the same or different radio frequency carrier waves and wherein the transmitters radiate continuously or successively at intervals preferably of one-third to one-half second. The carrier of one of the stations is modulated by a predetermined audio frequency note to effect the synchronous switching action of the described receiver.

Figure 4:
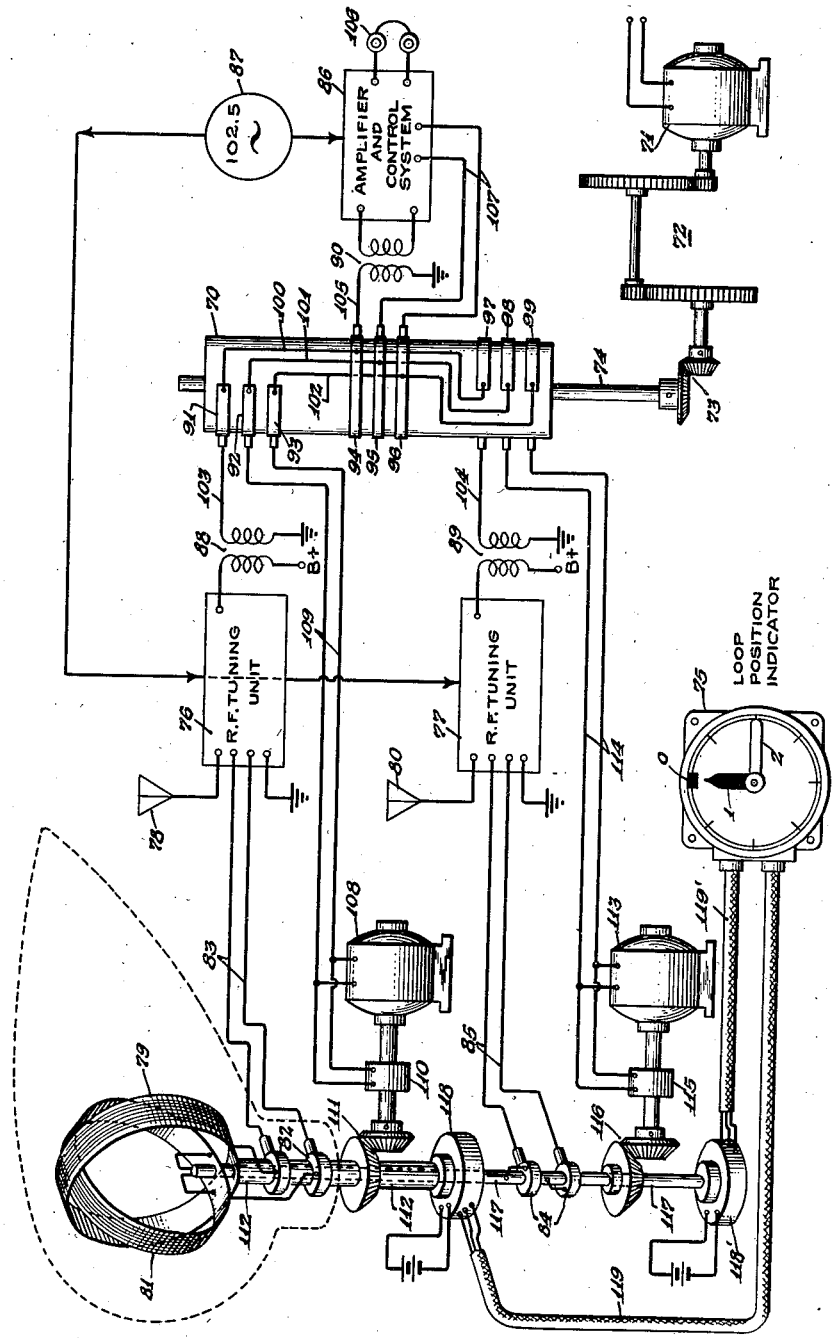
Fig. 4 is a diagrammatic showing of another form of the receiver system, wherein two separate radio frequency tuning units are successively switched into circuit relationship with a common amplifier unit.
Figure 5:
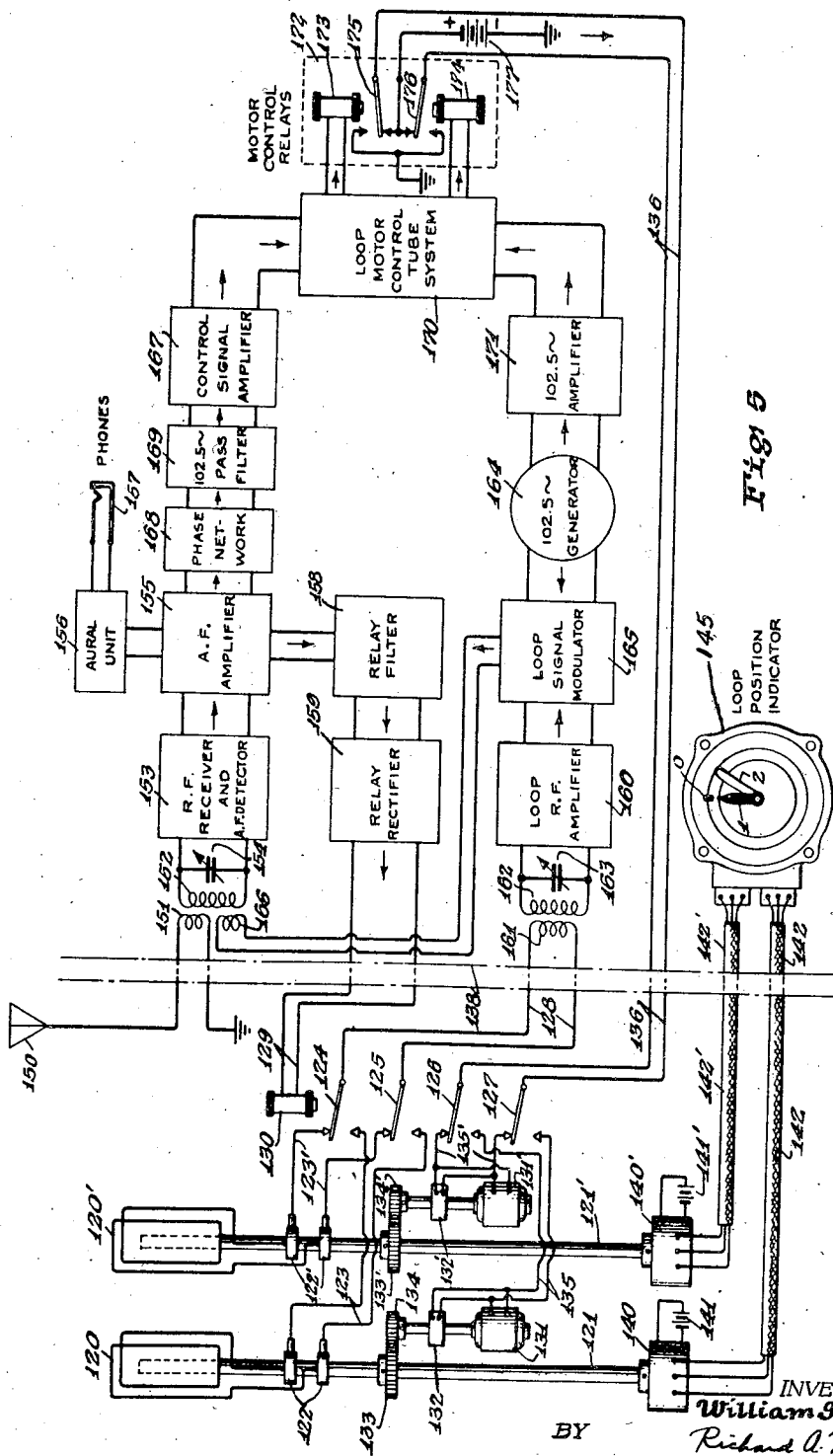
Fig. 5 is a diagrammatic arrangement of a receiver system with a single tuning unit and two automatically synchronously switched loop antennae systems connectible thereto.

The receiver system schematically illustrated in Fig. 4 is employed in conjunction with ground stations (T₁, T₂) having two separate radio frequency carrier waves radiating continuously and forms the subject matter of my copending application Serial No. 500,332, filed August 28, 1943, for "Directional radio receiver," which is a division of the present application and assigned to the same assignee. Separate radio frequency tuning units are used for both stations and a common amplifier and control system is used for both tuning units in a manner similar to the receiver of Fig. 3. The synchronous switching action, however, successively connecting the common amplifier-control system with the output of the radio frequency tuning units, is effective locally in the receiver. The synchronous switching means may be mechanical or electronic and is designed to switch the amplifier and control unit at predetermined intervals of equal duration, preferably in the range of one-third to one-half of a second, giving bearing indications closely corresponding with the desired lateral guidance indications.

In the system of Fig. 4, an electromechanical switching means is used, comprising continuously rotated drum contactor 70 driven by motor 71 through reduction gearing 72 and bevel gearing 73 connected to shaft 74 of the drum. Motor 71 is a constant speed motor of any preferred type suitably energized by a local source of the aircraft or vehicle. Drum 70 is rotated at the rate of about two to three revolutions per second in the preferred case, to properly actuate indicator needles 1 and 2 of the composite indicator 75 in accordance with the directional indications of the system, as will be described.

The radio system comprises two separate radio frequency tuning units 76 and 77. Units 76 and 77 have individual tuning controls whereby the pilot tunes to the predetermined frequencies of the respective ground stations T₁ and T₂. A rotatable directional antenna and a non-directional antenna is connected to the input of each radio frequency tuning unit. Non-directional antenna 78 and loop antenna 79 are connected to radio frequency tuning unit 76 and non-directional antenna 80 and loop antenna 81 are connected to unit 77. Loop antenna 79 is connected to unit 76 through slip rings 82 and connection leads 83. Loop 81 is connected to unit 77 through slip rings 84 and connection leads 85.

A single amplifier and control system 86 is employed for the receiver of Fig. 4 in a manner similar to unit 40 of the modification illustrated in Fig. 3, to conserve weight, bulk, and cost. A local source of audio frequency current 87 is used to produce the proper control signals for operating the loop antennae to their bearing positions. A frequency of 102.5 cycles has been found satisfactory. The schematic showing of the connection of generator 87 with units 76, 77 and 86 signifies its suitable connection in the circuit in a manner preferably as disclosed in my Patent No. 2,308,521 and my copending application Serial No. 291,807 above referred to.

The output of radio frequency tuning units 76 and 77 is at the chosen intermediate frequency common to the system. The mechanical or electronic switching operation of the outputs of units 76, 77 is thus performed more efficiently than at radio frequency. The output of unit 76 is connected to intermediate frequency transformer 88; the output of unit 77, to intermediate frequency transformer 89. Unit 86 comprises an intermediate frequency amplifier, rectifier, audio frequency amplifier, and electronic or thyratron control system. The latter unit is actuated to control the movement of the loop antennae into the bearing positions. An intermediate frequency transformer 90 connects to the input of system 86. The outputs of intermediate frequency transformers 88 and 89 are successively connected to the input of intermediate frequency transformer 90 through the switching means 70.

The drum commutator 70 comprises a plurality of commutator segments, arranged in three groups. The first group contains 180° or semicircular segments 91, 92, 93. The intermediate group contains 360° or circular segments or rings 94, 95, 96. The third group comprises 180° or semi-circular segments 97, 98, 99. First group 91, 92, 93 corresponds to radio frequency unit 76 and associated loop antenna system 79; the third group 97, 98, 99 corresponding to radio frequency unit 77 and associated loop antenna system 81.

Segments 91, 92, 93 are mechanically displaced by 180° with respect to segments 97, 98, 99. Only one of these two groups of segments can thus be in electrical contacting relationship with their associated brushes in alignment as shown. Continuous rotation of drum 70 causes alternate and successive connection and disconnection of radio frequency units 76, 77 and associated commutator segments. Commutator segments 91 and 97 are electrically connected with 360° segment or slip ring 94 through lead 100; segments 92 and 98, to ring 95 through lead 101; and segments 93 and 99, to ring 96 through lead 102.

The secondary winding of intermediate frequency transformer 89 is connectible to semicircular segment 91 through lead 103 and the secondary winding of transformer 89 to segment 97 through lead 104. Only one of the two tuning units 76, 77 is connectible to intermediate frequency transformer 90 at any given instant due to the 180° phase displacement of their corresponding segments 91, 97 on drum 70. The primary of intermediate frequency transformer 90 is in continuous connection with slip ring 94 through lead 105, and thus with either lead 103 or lead 104 to one of the units 76, 77. The common amplifier control system 86 correspondingly serves both radio frequency tuning units 76 and 77 due to the successive connection thereto. As indicated, head phones 106 may be connected to system 86 for aural reception through the audio frequency section thereof.

The control signal output of system 86, derived from the directionally received signals as modified by local generator 87, is conducted to the respective loop antenna drive systems as follows: output leads 107 of system 86 connect with slip rings 95, 96 through suitable brushes. Commutator segments 92, 93, in parallel connection with rings 95, 96, connect to motor 108 of loop antenna 79 through leads 109. Electromagnetic clutch 110 is in parallel connection with motor 108. Motor 108 drives loop antenna 79 through gearing 111 and loop sleeve 112. Motor 113 of the second loop antenna system 81 is connectable to segments 98, 99 through leads 114 and thence to the output of system 86 through leads 101, 102, rings 95, 96 and leads 107. Electromagnetic clutch 115 is connected in parallel with motor 113. Motor 113 drives loop antenna 81 through clutch 115, gearing 116, and loop shaft 117. Loop shaft 117 is concentric with sleeve 112 due to the coaxial arrangement of the loop antenna windings. A streamlined housing is indicated in dotted outline about the antennae upon external mounting thereof to reduce aerodynamic resistance in flight.

Simultaneous with the connection of the output of radio frequency tuning unit 76 to amplifier control system 86, motor 108 and electromagnetic clutch 110 of antenna system 79 are placed in electrical connection with the control output of system 86. During this interval, corresponding to the illustrated position of the drum 70, the other radio frequency tuning unit 77, its associated motor 113, and clutch 115, are disconnected from system 86. When unit 76 is tuned to "inner" transmitter station T₁, motor 108 is energized by system 86 to motivate loop antenna 79 into the null signal position or bearing relationship with station T₁, in the manner disclosed in my Patent No. 2,308,521.

A telemetering unit is used to communicate the angular position of loop antenna 79 to "in" needle 1 of composite indicator 75. An electrical telemetering arrangement is illustrated, comprising position transmitter 118 connected to meter 75 through electrical cable 119, and a position translator or indicator located within meter 75. My copending application, Serial Number 291,807, describes in further detail arrangements for the telemetering and composite arrangement within meter 75. The chosen interval for the switching action of one-third to one-half of a second is ample in the practical embodiment to bring the loop antenna into null signal or bearing relationship with the transmitter station it is tuned to.

During the next succeeding interval, loop antenna system 79 and its associated tuning unit 76 are disconnected from amplifier control system 86. The loop antenna 79 thereupon remains stationary, as does its bearing indication by needle 1. The second radio frequency tuning unit 77 and its associated loop antenna system 81 including the motor drive therefor are thereupon connected with system 86 through commutator segments 97, 98, 99. Radio frequency tuning unit 77 is, in the present case, tuned to the carrier frequency of the second transmitter, namely "outer" ground station T2. The output of system 86 operates motor 113 and magnetic clutch 115 to drive loop antenna 81 into the null signal position or bearing relationship with transmitter T2. The position of loop antenna 81 is communicated to "out" indicator needle 2 through position transmitter 118' and electrical cable 119' connecting to the position translator within indicator 75.

Lateral guidance with the system of Fig. 4 is obtained in the manner described hereinabove in connection with Fig. 1, using transmitter stations T1 and T2 with different carrier frequencies continuously radiated. The single amplifier control unit 86 is disclosed as mechanically switched between the two tuning units 76 and 77. The mechanical switching arrangement has been shown to simplify the disclosure of the principle involved in this form of the invention, namely that of switching the loop systems and indicators locally controlled at the receiving system. It is to be understood, however, that a corresponding electronic switching arrangement employing electronic relay tubes and a local oscillator may be used instead of the mechanical drum arrangement. The switching oscillator may be operated at a frequency of two to three cycles, corresponding to the preferred one-third to one-half second switching intervals.

*Detail receiver circuit considerations*

The lateral guidance or runway localizer systems of the present invention embody an automatic radio direction finder or indicator as a component. It is to be understood that the principles of operation of the localizer systems are independent of the specific form which the automatic directional component thereof assumes in practice. The automatic directional control element operates to orient a loop antenna to a bearing position with a radio transmitter. I prefer to employ the automatic directional operation disclosed for example in my Patent No. 2,308,521 and my copending application Serial Number 291,807, hereinabove referred to.

In Fig. 5 is disclosed a localizer system embodying a single radio frequency tuning unit and associated amplifier control system. The unitary tuning-amplifier-control portion, shown in schematic form, corresponds to the automatic direction indicator of my Patent No. 2,308,521 wherein detail considerations of preferred circuit arrangements are given. General considerations will be given of theory and operation of important component features of the automatic control arrangement, here indicated in block diagram form. A general description thereof follows:

The unitary tuning-amplifier-control system of the localizer of Fig. 5 controls the orientation of two separate and independently operable rotatable loop antenna systems through associated reversible motor drives. This system is employed with both ground transmitter stations having the same carrier wave frequency to permit the use of the single radio frequency tuning head. In this case it is necessary for transmitters T1 and T2 to be switched successively on and off to permit proper discrimination between the stations by the two loop antennae. Automatic switching of the antenna drive arrangements with the unitary control circuit is effected by relay action responsive to a predetermined audio frequency modulation on one of the two transmitters. A system for producing intermittent and successive radiation of the transmitter stations is disclosed in detail in the application Serial Number 291,807, particularly in connection with Figs. 4, 5 and 6 therein and forms the subject matter of my copending application Serial No. 495,978 filed July 24, 1943, for "Direction radio transmitting system," and assigned to the assignee of the present application.

Two separate rotatable loop antennae 120 and 120' are mounted upon individual shafts 121 and 121'. Concentric mounting thereof may be used. Slip rings 122 connect the winding of loop antenna 120 to leads 123 for connection to the back contacts of relay armatures 124 and 125. Similarly slip rings 122' connect the winding of loop antenna 120' to leads 123' for connection to the front contacts of relay armatures 124 and 125. Relay armatures 126 and 127 are employed for selectively connecting the control motor drive arrangement for the loop antennae to the receiver. Relay solenoid 130 is arranged to actuate relay armatures 124 to 127 when energized by predetermined currents from the automatic directional receiver system connected thereto through leads 129.

The position of loop antenna system 120 is controlled by reversible motor 131 connected to loop shaft 121 through electromagnetic clutch 132 and gearing 133, 134. Motor 131 is connected in parallel with magnetic clutch 132 and in turn to the back contacts of relay armatures 126, 127 by leads 135. The motor system of rotatable loop antenna 120' comprises motor 131' connected to shaft 121' through electromagnetic clutch 132' and gears 133', 134'. Motor 131' and clutch 132' are connected to front contacts of relay armatures 126, 127 through leads 135'. Relay armatures 126, 127 are connected to the motor relay system of the automatic directional unit through connection leads 136.

Relay armatures 124 through 127 are normally attracted to the upper or front contact position shown, through normal continuous energization of relay solenoid 130. With the relay armatures in the upper position, loop antenna 120' is in circuit connection with the automatic radio directional circuit through leads 128, and its associated motor and clutch 131', 132' are also connected thereto through leads 136.

The receiver system normally operates in this position as an automatic directional receiver indicating the bearing on any radio station tuned in by the receiver unit. A loop position transmitter unit 140' is employed to transmit the angular position of loop antenna 120' to remotely located meter 145. A direct current Selsyn telemetering arrangement incorporating a battery 141' and three-wire cable 142' is used in the embodiment of Fig. 5. Needle 2 of meter 145 is associated with rotatable antenna 120' and indicates its angular position on the scale of meter 145.

When the automatic receiver is to be used for blind approach in conjunction with field transmitter stations T1 and T2, the directional receiver circuit is tuned to the predetermined frequency of the transmitters. In the present instance, let us consider the carrier wave of "outer" station T2 as unmodulated, and "inner" station T1 as modulated by an audio note for effecting the switching action through solenoid 130. Thus, directional antenna 120' will be moved to point so that its null signal position corresponds to the direction towards station $T_2$, the unmodulated transmitter station and "out" indicator needle 2 of meter 145 will point towards station $T_2$. The automatic angular orientation of loop 120' through control motor 131' is effected during the transmission interval of station $T_2$, within one-third to one-half of a second in the preferred case.

During the transmission interval of station $T_1$, the predetermined audio frequency modulation of the radio frequency carrier wave at station $T_1$ will cause relay 130 to be deenergized, and relay armatures 124 to 127 will drop to the back contact position. Thus, while station $T_1$ is being received, antenna system 120' is automatically disconnected and antenna 120 is connected to the directional receiver. A separate telemetering system is connected to shaft 121 of loop antenna 120 so that needle 1 of indicator 145 will accurately point out the position which loop antenna 120 is made to assume, being a bearing on station $T_1$. D. C. Selsyn transmitter 140 is used, energized by battery 141 and connected to meter 145 through cable 142. Loop antenna 120 is then automatically moved so that its null signal position accurately corresponds to the direction towards "in" station $T_1$.

Indicator 145 corresponds to the indicator described in connection with Fig. 1 having "in" needle 1, and "out" needle 2. The zero index 0 corresponds to the axis of the aircraft. After adjustment of the tuning of the directional receiver to the carrier frequency of stations $T_1$ and $T_2$, blind approach guidance as described in connection with Fig. 1 is effected. Alternately radiating stations $T_1$ and $T_2$ cause relay solenoid 130 to correspondingly switch rotatable antenna system 120', and alternately system 120, out of and into circuit relation with the automatic directional receiver. The arrangement is such as to successively move the respective antennae and their associated needles on indicator 145 to point out, preferably to within 1° of arc, the direction towards the respective stations $T_1$ and $T_2$.

The directional receiver is remotely positioned with respect to the rotatable loop antennae and the non-directional antenna, as indicated by the broken lines 138. Non-directional antenna 150 is connected to primary winding 151 which is coupled to secondary winding 152 of the radio frequency transformer coupled to radio frequency receiver and audio frequency detector 153. Variable condenser 154 is shunted across secondary winding 152 and is adjusted to tune-in the proper radio frequency to be received for radio guidance or automatic direction finding as required.

The radio frequency signals impressed upon radio frequency receiver 153 are demodulated and impressed upon audio frequency amplifier 155. During the transmission interval of unmodulated transmitter $T_2$, no separate tone or audio frequency relay signal is derived and relay solenoid 130 remains normally energized attracting relay armatures 124 through 127 as indicated. However, during the transmission interval of radio transmitter $T_1$ modulated by a relay tone, say of 75 cycles, a corresponding 75 cycle note will appear at the output of audio frequency amplifier 155. The 75 cycle tone is impressed upon relay filter 158 which prevents the passage of other frequency signals and passes the predetermined relay frequency of 75 cycles in the present example.

The output of filter 158 is connected to relay rectifier 159, the output of which is connected to solenoid 130. A preferred arrangement for the actuation of solenoid 130 is such that the solenoid is normally energized connecting loop antenna system 120' to the directional receiver. Upon reception of a radio signal bearing a substantial 75 cycle (or other predetermined frequency) signal, relay 130 is arranged to be deenergized and switch the directional receiver from directional antenna system 120' to directional antenna system 120. It is to be understood that the relaying action wherein the predetermined (75 cycle) note causes energization of relay 130 instead of deenergization thereof may equally well be employed.

The loop winding relay armatures 124, 125 are coupled to the loop radio frequency amplifier 160 through radio frequency transformer 161, 162 by transmission cable 128 which is preferably of low impedance. A variable condenser 163 in shunt with the secondary winding 162 is used to tune-in the desired radio station. All the tuning controls such as condensers 154 and 163 are preferably mechanically ganged together to provide the unitary tuning control. It is to be understood that a plurality of receiving bands may be employed to permit operation of the receiver system over a wide range of radio transmission frequencies. If a particular frequency is used for effecting the blind approach to an airport, a rapid switch over means to bring the receive to that frequency may be provided, as will be understood by those skilled in the art.

In describing the operation of the automatic directional receiver section, which lies to the right of broken lines 138, reception by one of the loop antennae is first assumed. With the position of relay armatures 124 through 127 as shown in Fig. 5, loop antenna 120' and its associated control motor circuit are connected to the automatic receiver. In accordance with the automatic receiver used in the system of the present invention and described in detail in my Patent No. 2,308,521 and copending application Serial Number 291,807 referred to, a loop control signal is provided dependent upon the received loop antenna signal, to operate the motor drive for the loop antenna and rotate it to its null position with respect to the oncoming radio signals.

The normal or stable position of the loop antenna is at the null or electrical neutral position with respect to the oncoming radio signals from the associated transmitter station, giving an exact angular indication of the direction to the transmitter of the radio signals. In the present case, transmitter $T_2$ is assumed to control the orientation of loop antenna 120' and needle 2. When station $T_1$ is transmitting, loop antenna 120 instead is connected to the system, resulting in a similar electrical action. When the angular position of the loop antenna 120' is changed from null during approach maneuvers, the radio signal is picked-up by the loop and impressed upon amplifier 160. The magnitude and phase of this signal depends upon the amount of the off-null angular position of the loop and the direction of the transmitter to the right or left thereof, respectively.

A local generator 164 of an audio frequency current, preferably of the order of one hundred cycles, is used to modulate the radio signals derived from the loop antenna and produce a resultant tone modulated radio signal. I prefer to use a tone signal of 102.5 cycles as indicated in the drawings, but a different frequency may instead be used as long as it is different than the signal for relay 130. Loop signal modulator 165 schematically designates the modulation stage, preferably a balanced modulator, for combining the loop signal of 160 with the tone signal of 164.

The resultant tone modulated radio signal at 165 has a magnitude and phase dependent upon the off-null position of the receiving loop antenna. The tone modulated signal is then suitably combined with the non-directionally received signal from antenna 150 by a coupling means, such as coupling coil 166 linked with secondary winding 152 of the input transformer to radio frequency receiver 153. The superposition of the non-directional radio signals with the locally modulated loop signals provides a resultant radio signal with the 102.5 cycle tone component having a magnitude and relative phase dependent upon the off-null position of the loop antenna with respect to the oncoming wave. Radio frequency receiver 153 may be a tuned radio frequency circuit or a superheterodyne circuit. The receiver unit 153 contains a demodulator or detector for the audio frequency components of the amplified radio signals. The audio frequency signals at the output of unit 153 comprise modulations of the original radio wave plus the 102.5 cycle tone or control signal obtained when the loop antenna is off null.

Audio frequency amplifier 155 is connected to the output of receiver detector unit 153. Amplifier 155 supplies aural unit 156 with sufficient energy for operating headphones connectible to jack 157 at the output thereof. The output of audio frequency amplifier 155 is also connected to a separate control signal amplifier 167 through a suitable phase shifting net-work 168 and 102.5 cycle pass filter 169. The 102.5 cycle tone signal is thus filtered out from the output of audio frequency amplifier 155 and amplified a substantial degree for use as a control signal to operate the relay control tube system indicated at 170. A preferred arrangement for unit 170 is disclosed in detail in my Patent No. 2,308,521 and my copending application Signal No. 291,807, referred to hereinabove. The relay control tube system is energized by both the control signal from amplifier 167 as well as the correspondingly amplified tone signal obtained directly from generator 164 and intermediate tone amplifier 171.

Control relays indicated at 172 comprise solenoids 173 and 174 connected to the relay control tube system 170. Solenoids 173 and 174 are selectively energized from control system 170 in accordance with the angular position to the right or left of the loop connected, with respect to the direction of the oncoming radio waves. When relay 173 is energized, it attracts its armature 175 to close the electrical circuit through ground including its front contact, battery 177, and the loop motor. For the antenna 120', motor 131' is energized. Motors 131 and 131' are connected in a predetermined manner to operate in the direction to rotate loop antennae 120 and 120' respectively towards their null signal position through their shafts 121 and 121' and associated gearing. Energization of either relay 173 or 174 is determined upon the direction of the angular deviation of the connected loop antenna (120') from its null position with respect to the radiating station (T₂) so that the proper counter-rotation of the associated motor (131') will occur to bring the loop antenna to the null signal position.

When the loop antenna reaches, or is substantially at, its null signal position a zero or substantially zero magnitude radio frequency signal is impressed upon radio frequency amplifier 160 for modulation at 165 by the generated tone signal from 164. The magnitude of the control signal from amplifier 160 accordingly is also zero, or substantially zero at that time, and control relays 172 are in the deenergized position shown. The loop accordingly remains stationary when it is at its electrical signal null position with respect to the direction of the oncoming waves. This position corresponds to the geometric position of the loop where the plane of the open face thereof is perpendicular to the direction of the oncoming radio waves.

Should the aircraft carrying the loop antenna deviate from this direction the loop will be energized by the oncoming radio signal from the transmitter, and impress it upon amplifier 160 with a magnitude and phase relation corresponding to the altered direction thereof. Should the deflection of the aircraft cause the loop to receive a signal of phase corresponding to that which energizes solenoid 173, the above described operation of the loop motor is repeated to bring the loop to the new null signal position. Should, however, the aircraft turn so that the loop is deviated in the opposite angular direction, the phase of the control signal impressed upon relay control tube system 170 will be different by 180° and energize solenoid 174 instead.

When solenoid 174 is energized, its armature 176 is attracted to the front contact to electrically complete the connected loop motor circuit including its associated clutch, ground, and battery 177. Electromagnetic clutch 132' is thereupon immediately engaged and motor 131' is rotated in the direction opposite to that corresponding to its energization by solenoid 173 when loop system 120' is in connection with the receiver as shown. Motors 130 and 130' are reversible in the present case, and are not necessarily a direct current type. Relay armatures 175 and 176 are arranged so that the direction of current flow through the connected motor is selectively reversed to cause the motor to rotate its associated loop towards its null signal position in the shorter path of rotation. Thus, when solenoid 174 is energized, the motor will rotate in a direction opposite to that due to energization of relay 173.

*Continuous indication receiver systems*

The localizer receiver system of Fig. 2, embodying two complete automatic directional control systems, provides continuous control actuation of the two loop antennae and their respective indicators. However, those localizer systems disclosed in connection with Figs. 3, 4 and 5 use synchronous switching to connect two separate loop antenna systems with a single directional control unit, resulting in the intermittently operated indications. Such intermittent indication control is sufficient in most commercial and practical uses, particularly where the switching occurs at intervals of the order of one-third to one-half of a second as disclosed. Since the speed of the aircraft during approach maneuvers is generally not over 150 miles per hour, and more usually of the order of 100 miles per hour and less, the actuated indications give satisfactory results in practice, particularly since each indicator remains at its last actuated position until it is moved during the successive control interval.

Figure 6:
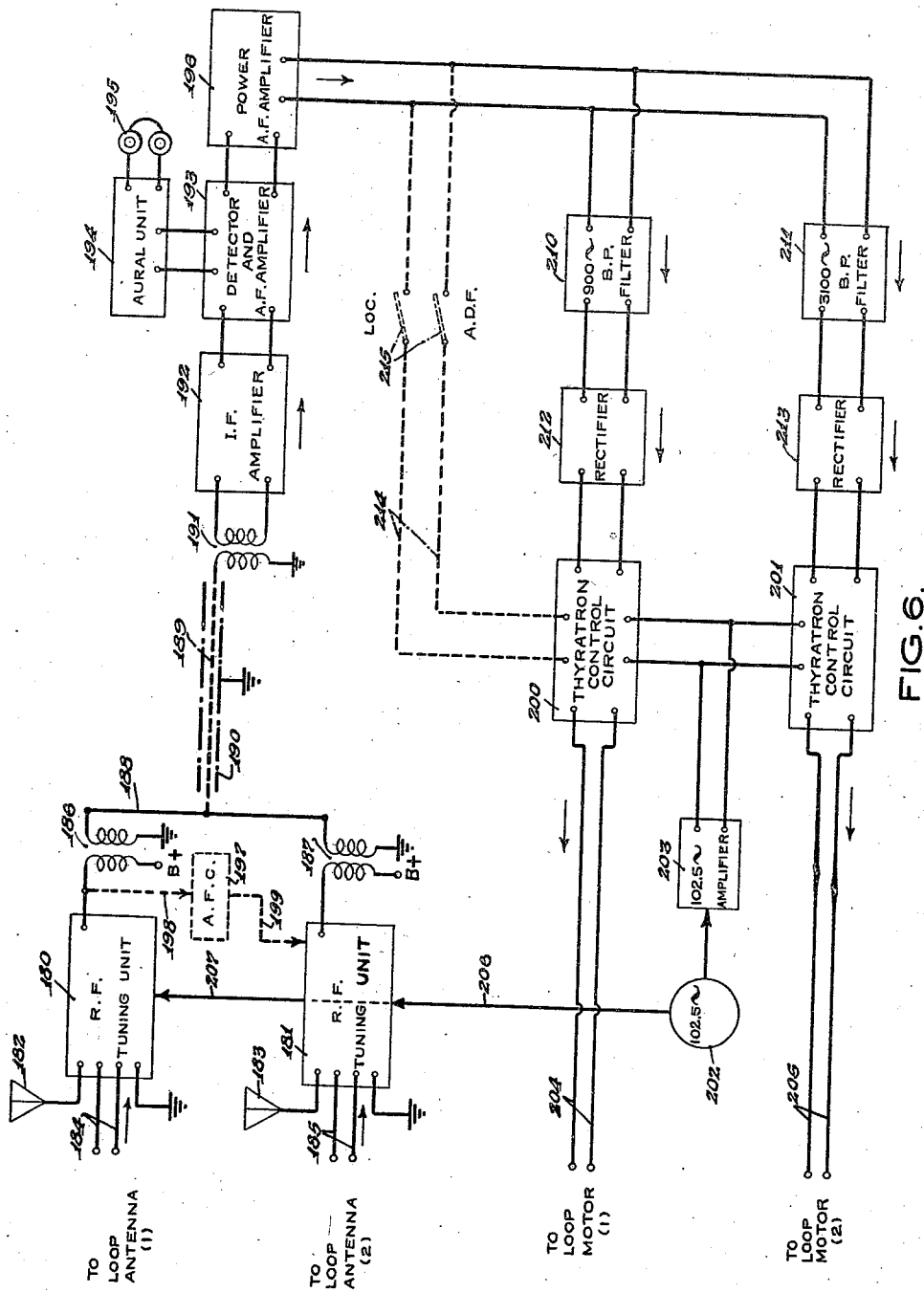
Fig. 6 is a schematic electrical diagram of a form of the invention using separate tone modulations applied to the ground radio transmitters.
Figure 7:
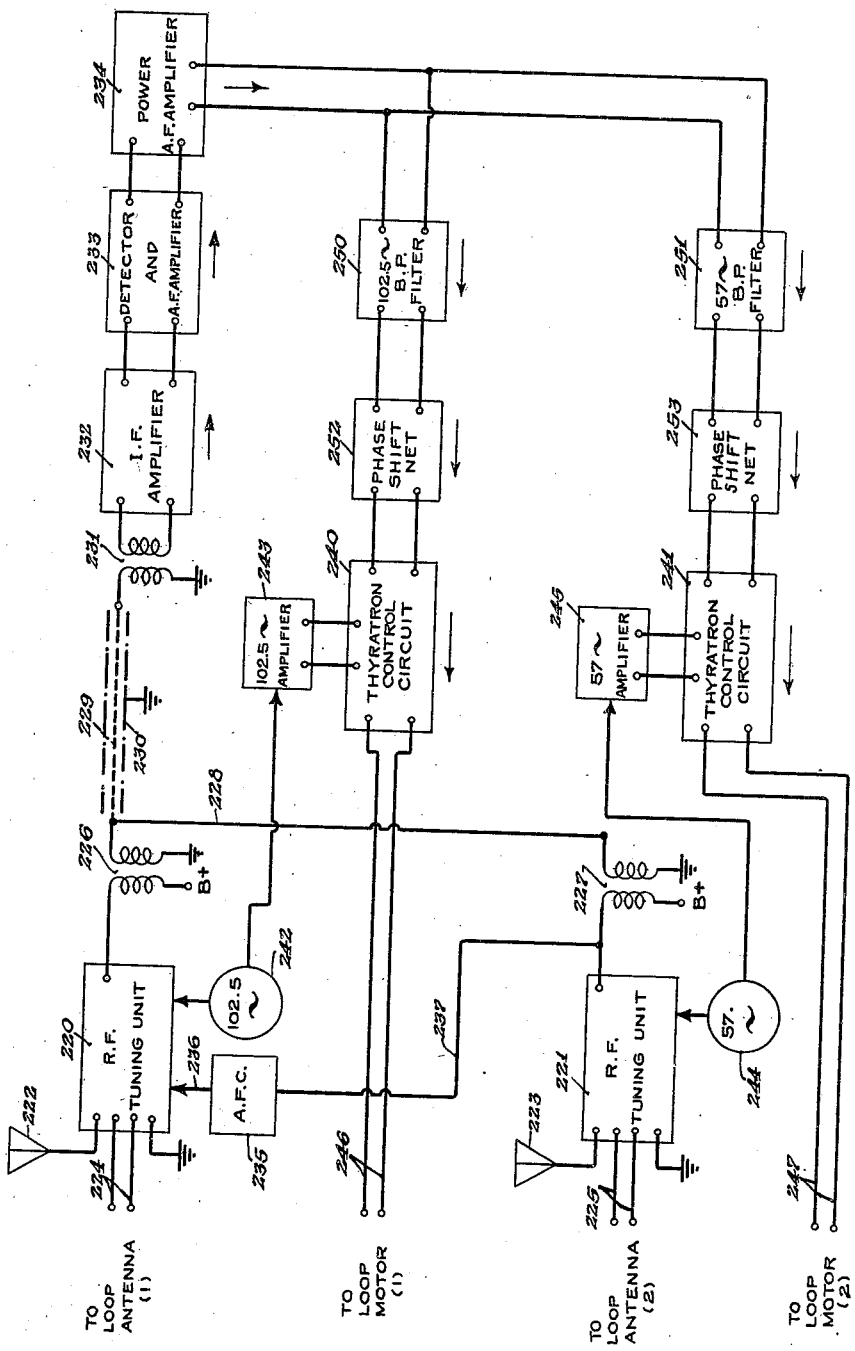
Fig. 7 is a schematic electrical diagram of another form of the invention using two separate audio frequency control signals in the receiving system.

Continuous indicator actuation corresponding to the action of the dual system of Fig. 2 may be preferred in some practical application. Such continuous actuation avoids possible jerkiness of indication, and affords continually accurate indications. In the form of the invention illustrated in Figs. 6 and 7 continuous dual indication is provided. A single intermediate frequency rectifier and audio frequency amplifier system is used for both sections of these localizer arrangements. These embodiments reduce the weight, bulk and initial cost of the apparatus as compared with the completely dual system of Fig. 2. The system of Fig. 6 is used in conjunction with ground stations $T_1$ and $T_2$ continuously radiating separate carrier wave frequencies individually modulated by different frequency tones. The form disclosed in connection with Fig. 7 is used with ground stations $T_1$ and $T_2$ continuously radiating separate carrier wave frequencies, which are not modulated by control tones but have the separate tones incorporated locally in the receiver.

Fig. 6 is a schematic block diagram of the continuously indicating receiver system responsive to ground stations having separate carriers and control tone modulations, and which forms the subject matter of my copending application Serial No. 503,870, filed September 27, 1943, for "Dual radio direction finder," which is a division of the present application and assigned to the same assignee. Two separate radio frequency tuning units 180 and 181 are used, as in the embodiments of Figs. 3 and 4. Tuning units 180, 181 have individual non-directional antennae 182, 183 as well as separate rotatable loop antenna systems, not shown but corresponding to those illustrated in the previous figures. Leads 184 connect the winding of one loop antenna (1) to the input of radio frequency tuning unit 180. Leads 185 connect the second loop antenna (2) to the input of radio frequency tuning unit 181. Tuning units 180 and 181 have separate manual tuning controls for tuning to the predetermined frequencies of the respective ground stations. Let us assume that unit 180 is tuned to "inner" station $T_1$; and unit 181, to "outer" station $T_2$.

It is to be understood that suitable beat frequency oscillators are incorporated in the respective tuning units to give a signal output at the predetermined intermediate frequency, such as 455 kilocycles. Intermediate frequency transformers 186 and 187 are connected respectively to the outputs of radio frequency tuning units 180 and 181. The secondary windings of intermediate frequency transformers 186, 187 are electrically connected together by lead 188 to intermediate frequency transmission cable 189. Cable 189 is long, for remotely positioning the amplifier and control units of the remainder of the system from tuning units 180, 181 preferably located in the cockpit adjacent the pilot. Cable 189 is electrically shielded by ground shield 190.

The output of intermediate frequency transmission cable 189 is connected to the primary of intermediate frequency transformer 191, the secondary of which is connected to the input of the intermediate frequency amplifier unit 192. Intermediate frequency amplifier 192 may well have several stages of amplification. The outputs of both radio frequency tuning units 180 and 181 are simultaneously amplified. A detector-audio frequency amplifier unit 193 is connected to the output of intermediate frequency amplifier 192. An aural unit 194 is connected to audio frequency amplifier unit 193 to provide audio signals for headphones 195, when desired. A power audio frequency amplifier 196 is connected to the output of amplifier unit 193 to sufficiently increase the level of the audio frequency components reaching it to actuate the loop control and relay units of the system.

In view of a single intermediate frequency amplifier 192 used for amplifying the outputs of two separate radio frequency tuning units 180, 181, I prefer to employ an automatic frequency control unit A. F. C., schematically indicated at 197 in Fig. 6. Automatic frequency control unit 197 is connected between radio frequency units 180 and 181 by respective leads 198 and 199. The design of the automatic frequency control circuit and its arrangement between units 180 and 181 is optional and in accordance with standard practice in the radio art. The resultant intermediate frequency of one of the tuning units, for example 180, may be used as the reference frequency initiating the automatic frequency control action of unit 197 to correspondingly control the resultant intermediate frequency of unit 181.

The automatic frequency control action is arranged so that a negligible or very small frequency difference exists between the intermediate frequency outputs of units 180 and 181. The automatic frequency control action is preferably performed directly on the beat frequency oscillator of unit 180 in order that the resultant intermediate frequency from the unit 181 may correspond closely with that of unit 180. The design of the A. F. C. unit 197 is preferably such that the difference frequency at the outputs of units 180 and 181 is of the order of 50 cycles or less to insure proper selective filtering action with respect to the audio frequency notes from the original carrier frequency waves.

In the system of Fig. 6, two separate antenna control units 200, 201 are used. Control units 200, 201 are preferably of the type disclosed in my Patent No. 2,308,521 and my copending application Serial Number 291,807 employing two gaseous relay tubes or thyratrons, arranged for selectively operating reversible loop motors in accordance with received radio signals. The thyratron control circuits 200, 201 correspond to tube system 170 and motor control relays 172 illustrated in Fig. 5. A preferred arrangement for the thyratron control circuit indicated schematically at 200, 201 together with a detailed consideration of its operation for loop position control is disclosed in my application, Serial Number 291,807 in connection with Figs. 11 and 12 thereof, and forms the basis of my copending application, "Electronic control circuits," Serial Number 321,167 filed on February 28, 1940.

The thyratron control circuits 200, 201 are actuated by a locally generated audio frequency signal of 102.5 cycles, in the present case, emanating from generator 202. One portion of each thyratron control circuits 200, 201 is directly energized by the local 102.5 cycles signal, serving as a reference for phase and amplitude comparisons. Amplifier unit 203 is interposed between the thyratron control circuits and generator 202 to sufficiently amplify the generated 102.5 cycles signal, and maintain the corresponding input to units 200, 201 at a predetermined level. The output of thyratron control circuit 200 is connected through leads 204 to the reversible loop motor (1) associated with loop antenna (1). Thyratron control circuit 201 is connected through leads 205 to reversible loop motor (2) of loop antenna system (2).

The 102.5 cycle generator unit 202 is also connected to each radio frequency tuning unit 180, 181, schematically indicated by leads 206, 207, to properly modulate the received radio frequency signals with the 102.5 cycle note and derive the control signal for amplification and introduction to thyratron control circuits 200, 201 and effect selective motivation of the respective loop motors. Connection of generator 202 with tuning units 180, 181 is similar to the connection of the corresponding 102.5 cycle oscillator in the directional circuits of my Patent No. 2,308,521 specifically in connection with Fig. 2 thereof, and my copending application Serial Number 291,807 specifically in connection with Fig. 9 thereof.

The localizer system of Fig. 6 is used with ground stations $T_1$ and $T_2$ having different frequency carrier waves individually modulated by separate audio frequency notes. The audio frequency modulations on the received carrier ways are used to selectively operate the respective thyratron control circuits 200 or 201 to correspondingly continuously actuate loop antenna and associated motor drive systems (1) and (2). The frequency of each carrier wave is optional, as is the frequency of the audio frequency modulation thereon. The radio frequency waves as well as their audio frequency modulations are preferably non-harmonically related to avoid possible interfering action either in reception by the radio frequency tuning units 180, 181 or in the selective filtering action of the audio frequency control signals in the control circuits of the receiver, as will be understood by those skilled in the art.

In a preferred illustration of this invention the following conditions apply: the audio frequency modulation on the carrier wave ($f_1$) of "inner" station $T_1$ is 900 cycles. The audio frequency modulation of carrier wave ($f_2$) of "outer" station $T_2$ is 3100 kilocycles. Carrier frequencies $f_1$ and $f_2$ are non-harmonically related. Their respective audio frequency modulations, 900 and 3100 cycles herein, which give corresponding side bands on their respective carrier waves, are non-harmonically related with respect to each other as well as with respect to the locally generated control signal, 102.5 cycles. It is to be understood that different audio frequencies may be chosen.

In the following analysis any frequency difference between the intermediate frequency outputs of units 180 and 181 will be neglected, particularly in view of the automatic frequency control action by unit 197. Such residual beat note should not interfere with the action of the system. Should no automatic frequency control action be used, it is desirable to raise the frequency of the signal corresponding to the 102.5 cycle note so as to insure the selective filtering action on the 900 and 3100 cycle notes to be described.

Assuming no signal modulations on the radio frequency waves as received other than the 900 and 3100 cycle notes, the following relations hold: The component frequency waves received from station $T_1$ by radio frequency tuning unit 180 are ($f_1+900$), $f_1$, and ($f_1-900$). The component frequency waves received by radio frequency tuning unit 181 from station $T_2$ are ($f_2+3100$), $f_2$, and ($f_2-3100$). In accordance with the operation of the directional system, the local audio frequency signal, 102.5 cycles in the present case, further modulates each of the received radio frequency components, superimposing 102.5 cycle sidebands on each of the received radio frequency components. The resultant radio frequency signals in tuning units 180, 181, after modulation by the 102.5 cycle signal are then as follows: In tuning unit 180 we have ($f_1+900\pm102.5$), ($f_1-900\pm102.5$), ($f_1\pm900$), ($f_1\pm102.5$), and ($f_1$). In radio frequency tuning unit 181 we have ($f_2+3100\pm102.5$), ($f_2-3100\pm102.5$), ($f_2\pm3100$), ($f_2\pm102.5$), and ($f_2$).

The locally modulated radio frequency components are then modified by respective beat frequency oscillators of the radio frequency units 180, 181 producing a common intermediate frequency output for both of the units. The intermediate frequency used is optional, and may for example be 455 kilocycles. The resultant intermediate frequency signal band comprises a plurality of frequencies each corresponding to a component of the modulated radio frequency signal band. Designating the intermediate frequency signal as (i. f.), we find the following component frequencies at the combined output of units 180, 181 as transmitted by cable 189 to the input of intermediate frequency amplifier 192: From unit 180 we obtain (i. f.$+900\pm102.5$), (i. f.$-900\pm102.5$), (i. f.$\pm900$), (i. f.$\pm102.5$), and (i. f.). From unit 181 we obtain (i. f.$+3100\pm102.5$), (i. f.$-3100\pm102.5$), (i. f.$\pm3100$), (i. f.$\pm102.5$), and (i. f.).

The i. f. signal component band is amplified through intermediate frequency amplifier 192 and impressed upon detector-audio frequency amplifier unit 193. Rectification or demodulation of the intermediate frequency band results in the following audio frequency components, which are amplified by unit 193: Due to unit 180, we have ($900\pm102.5$), (900), and (102.5). Due to unit 181 we have ($3100\pm102.5$), (3100), and (102.5).

The respective audio frequency signals are thereupon amplified to a sufficiently high level by audio frequency power amplifier 196 for introduction to thyratron control circuits 200, 201 through selective band pass filter units 210, 211. Filter unit 210 is designed to efficiently pass the 900 cycle signal and its 102.5 cycle side bands, reject the 3100 cycle signal with its 102.5 cycle side bands as well as reject the 102.5 cycle signal also present. The audio frequency signal components passing through the 900 cycle band pass filter 210 are accordingly: ($900\pm102.5$), and (900).

Similarly, the 3100 cycle band pass filter unit 211 is designated to efficiently pass the 3100 cycle signal with its associated 102.5 cycle side band, reject the 900 cycle signal with its side bands as well as the 102.5 cycle signal. Band pass filter 211 passes the audio frequency signals: ($3100\pm102.5$), and (3100).

Band pass filters 210, 211 need not be bulky or expensive. The separation of the respective audio frequency signals and side bands is sufficiently wide so that these filters need not be very selective in their design. The band pass width of the filters is twice the local 102.5 cycle frequency, or 205 cycles. The separation between the 900 cycle band and the 3100 cycle band is about 2000 cycles, which can be effected without much difficulty in the practical case. Similarly, the rejection of the 102.5 cycle signal by the 900 band pass filter is also readily effected in practice.

The output of 900 cycle band pass filter 210 is impressed upon rectifier unit 212 which demodulates the side bands to yield a 102.5 cycle resultant signal. The 102.5 cycle signal from rectifier 212 is directly impressed upon thyratron control circuit 200 for coaction therewith together with the reference 102.5 cycle signal impressed thereon through amplifier 203. The phase of the 102.5 signals from units 203 and 212 impressed upon thyratron control circuit 200 is initially adjusted to be either in phase or 180° out of phase relation by means similar to phase network 168 of Fig. 5.

It is feasible to include an audio frequency amplifier and 102.5 cycle pass filter in rectifier unit 212 to insure efficient actuation of control circuit 200. Control circuit 200 motivates motor (1) of loop system (1). The 3100 cycle signal and its 102.5 cycles side bands pass from the output of filter unit 211 into rectifier unit 213 to yield a corresponding 102.5 cycle signal for impression upon thyratron control circuit 201 to control the operation of loop motor (2).

The 102.5 cycle signal derived from rectifier 212 and impressed upon control circuit 200 corresponds in magnitude and phase to that of the radio frequency signal as received by loop antenna (1) and impressed upon radio frequency tuning unit 180. Thyratron control circuit 200, in response to the control signal it receives from unit 212, operates loop motor (1) in a clockwise or counter-clockwise direction to bring loop antenna (1) to a null signal position or bearing relationship with transmitter $T_1$. The output of rectifier 213 correspondingly controls the operation of thyratron control circuit 201 to properly orient loop motor (2) to continuously hold loop antenna (2) in the null signal position or bearing relationship with transmitter $T_2$. A composite indicator with "in" and "out" needles is coupled with loop antennae (1) and (2) to afford continuous directional indication and lateral guidance.

The system of Fig. 6 may be readily converted to a general automatic direction finder such as the system described in my Patent No. 2,308,521. Switch 215 may be used to by-pass the signal output of power audio frequency amplifier 196 directly to thyratron control circuits 200 through connection leads 214 shown in dotted. With 215 in the open position illustrated, the system operates as a localizer in the manner described. Upon closing switch 215 to the "A. D. F." position, the system is connected to a general automatic direction finder using only antenna system (1), its motor (1) and one of the thyratron control units therefor, 200 in the present case. General automatic direction finder operation does not entail a predetermined modulation of the transmitted carrier as in the localizer operation where 900 and 3100 cycle modulations are used. The control signal resulting from a generally received radio frequency signal, accordingly would not suitably pass through filter units 210 and 211. The 102.5 cycle signal derived from the received radio frequency signal is introduced to thyratron control circuit 200 directly through leads 214 and switch 215, for actuating the circuit and operate the corresponding loop antenna system (1) and its associated indicator in accordance with the direction towards the station tuned-in by radio frequency tuning unit 180.

Fig. 7 is a schematic illustration of a further form of my present invention, wherein continuous actuation of the two loop antennae and their corresponding indicators is provided. This modification differs from that of Fig. 6, in that the two ground transmitters ($T_1$ and $T_2$) are not modulated by control tones. In the system of Fig. 7, the control tones are provided locally in the receiver. One of the local frequencies is the 102.5 cycle note as provided in the previous modifications. Another signal is provided similarly but of a different frequency and non-harmonically related therewith. Such other frequency may be 57 cycles or a higher one, for example 150 cycles, 190 cycles, 250 cycles, etc.

Two separate radio frequency tuning units 220, 221, similar to those of Fig. 6, are arranged for individually tuning-in the two radio signals from stations $T_1$ and $T_2$. These radio signals are continuously radiated, and are of different frequencies. One of these carrier waves may be voice-modulated to provide information for the pilot during approach maneuvers. Each radio frequency tuning unit 220, 221 has a non-directional antenna 222, 223 connected thereto. A rotatable loop antenna system is also connected to each radio frequency tuning unit as indicated by connection leads 224 and 225 respectively; the former connecting with the winding of loop antenna system (1), the latter with that of loop antenna system (2).

The intermediate frequency output signals of the respective radio frequency tuning units 220, 221 are connected together by respective intermediate frequency transformers 226 and 227, the secondaries of which are interconnected by lead 228. The common intermediate frequency output of two tuning units is conducted to the amplifying and control section of the receiver through low impedance intermediate frequency cable 229 electrically shielded by sheath 230 and intermediate frequency transformer 231. The secondary of intermediate frequency transformer 231 is coupled to the input of the single intermediate frequency amplifier 232 for the receiver. A detector and audio frequency amplifier unit indicator 233 is coupled to the output of intermediate frequency amplifier 232 for converting the intermediate frequency signals to corresponding audio frequency notes.

A power audio frequency amplifier 234 further amplifies the audio frequency signals of unit 233 sufficiently for properly energizing the relay control circuits for the respective loop antenna systems. An automatic frequency control circuit is preferably provided in the system of Fig. 7, to insure a negligible residual beat signal due to some discrepancy in the intermediate frequency outputs of radio frequency tuning units 220, 221. Such automatic frequency control unit, A. F. C., is indicated at 235 schematically connected between radio frequency tuning units 220 and 221 in a suitable manner through leads 236 and 237. The output of audio frequency power amplifier 234 is connected, through suitable filters and phase shift networks to be described, to thyratron control circuits 240 and 241.

A separate local audio frequency signal is provided for energizing each of the thyratron control circuits. The output of the generator 242 of the 102.5 cycle signal is connected to thyratron control circuit 240 through a selective amplifier 243. The 102.5 cycle generator 242 is also connected with radio frequency tuning unit 220 to initiate the control signal modified by radio frequency signals for controlling the thyratron circuit in a manner previously described. Similarly, a second local generator 244 is provided, of a different frequency than generator 242, for example of 57 cycles as indicated in the drawings. The 57 cycle generator 244 is connected to thyratron control circuit 241 through selective amplifier 245. Generator 244 is connected with radio frequency tuning unit 221 to provide the radio frequency modified control signal for thyratron circuit 241. The output of the first thyratron control circuit 240 is connected to the loop motor (1) associated with loop antenna system (1) through connection leads 246. The output of thyratron control circuit 241 is connected through leads 247 to the control motor associated with loop antenna (2).

An analysis of the signal frequency components of intermediate frequency amplifier 232 and of detector-audio frequency amplifier unit 233, will show that, aside from original modulations of the radio frequency carrier waves, a 102.5 cycle and a 57 cycle signal are present. These resultant signals are introduced to power amplifier 234, and each corresponds to the reception of the radio frequency signals by the respective loop antenna systems (1) and (2) in phase and magnitude. When, of course, a loop system is in the null signal position, substantially no audio frequency control signal will appear in power amplifier 234 corresponding to that antenna.

The output of power amplifier 234 is connected to 102.5 cycle band pass filter 250 as well as to 57 cycle band pass filter 251. Filters 250, 251 correspond to filter units 210, 211 of Fig. 6 except for their frequency ranges. The purpose of filters 250 and 251 is to segregate the two control signals 102.5 cycles and 57 cycles in the present illustration, and properly direct them to the thyratron control circuits 240 and 241, preventing interference and insuring proper action. Different control frequencies than those chosen for illustration may be employed, with corresponding filter units being provided. The output of band pass filter 250 is impressed upon thyratron control circuit 240 through phase shift network 252 for efficiently controlling the action of thyratron circuit 240. Similarly, the output of band pass filter 251 is impressed upon thyratron control circuit 241 through the phase shift network 253.

Loop antennae (1) and (2) are motivated to their null signal or bearing position with respect to the corresponding ground transmitter to which its associated radio frequency tuning unit 220 or 221 is tuned in a manner similar to the system of Fig. 6. The corresponding indicators of the composite lateral guidance meter are moved with the loop to give the lateral guidance readings. The operation of the antennae and their respective indicator needles is continuous during continuous transmission of the separate radio frequencies from ground stations $T_1$ and $T_2$.

The continuous dual control arrangements of Figs. 2, 6 and 7 may be employed for other functions than the associated lateral guidance indications described. Thus, one of the loop antennae and its associated indicator may be used to correspond to simple automatic directional guidance, for example in radio approach to a single station; while the other antenna of the dual receiver system is used for glide path guidance in conjunction with a ground station radiating horizontally polarized radio waves, being a horizontally held loop antenna.

It is to be understood that modifications and changes may be made in the disclosed embodiments illustrating the principles of my invention without departing from the broader spirit and scope thereof, and accordingly I do not intend to be limited except as set forth in the following claims.

What I claim is:

1. The method of laterally guiding a mobile craft with respect to a predetermined path which comprises transmitting signals of different radio frequencies from a plurality of points spaced along the path, directionally receiving the different radio frequencies aboard the craft, locally modulating each of the directionally received signals with a different control tone, transforming the locally modulated radio signals to corresponding signals with a substantially common carrier frequency which contain the respective different control tone modulations, amplifying the carrier frequency signals and deriving their corresponding different tone modulations, segregating the respective tone modulations and obtaining therewith a uni-directional bearing on each of the transmitted radio signals with respect to the lateral position of the craft, and correlating the derived bearings to obtain a continuous unambiguous position indication of the craft with respect to said points and path.

2. The method of laterally guiding a mobile craft with respect to a predetermined path which comprises transmitting signals of different radio frequencies from a plurality of points spaced along the path, directionally receiving the different radio signals aboard the craft, locally modulating each of the directionally received radio signals with a separate predetermined control tone, transforming the modulated radio signals to corresponding signals with a substantially common intermediate frequency which separately contain the different control tone modulations, jointly amplifying the intermediate frequency signals and deriving their corresponding tone modulations, segregating the respective derived control tone signals and obtaining therewith a uni-directional bearing on each of the transmitted radio signals with respect to the position of the mobile craft, and correlating the derived bearings to obtain a continuous unambiguous position indication of the craft with respect to said points and path.

3. The method of laterally guiding an aircraft with respect to a predetermined path of approach to a runway which comprises transmitting signals of different radio frequencies from two points spaced along the path, directionally receiving the different radio signals aboard the aircraft, modulating each of the directionally received radio signals with a different audio frequency, transforming the radio signals to corresponding signals with a substantially common carrier frequency which separately contain the audio frequency modulations, amplifying the common carrier frequency signals and deriving their corresponding audio frequency modulations, segregating the respective audio frequency modulations and obtaining therewith a uni-directional bearing on each of the transmitted radio signals with respect to the lateral position of the aircraft, and correlating the derived bearings to obtain a continuous unambiguous position indication of the craft with respect to said points and path.

4. A directional radio receiving system comprising a plurality of rotatable directional antennae having individual motive drives; a radio frequency tuning unit connected to the winding of each of said antennae for tuning-in individual radio frequency signals; means including a local audio frequency signal source connected to each of said tuning units for modulating the tuned-in radio frequency signals with different audio frequency modulations; means associated with said tuning units for transforming the radio frequency signals to corresponding intermediate frequency signals having substantially the same frequency; means including circuit connections with said tuning units for jointly amplifying said transformed signals and for deriving their separate audio frequency modulation signals; filter means for segregating the derived signals of different frequency; and control means selectively responsive to the segregated signals for individually operating said motive drives to orientate their associated loop antennae into uni-directional bearing relationship with the respective radio signals.

5. A directional radio receiving system comprising a plurality of rotatable directional antennae having individual motive drives; a radio frequency tuning unit connected to the winding of each of said antennae for tuning-in individual radio frequency signals; means including a local audio frequency signal source connected to each of said tuning units for modulating the tuned-in radio frequency signals with an individual control tone of differing frequencies; means associated with said tuning units for transforming the radio frequency signals to corresponding signals having substantially the same frequency; means including circuit connections with said tuning units for amplifying said transformed signals and deriving their control tone modulation signals of different frequency; filter means for segregating the derived signals; and control means selectively responsive to the segregated derived tone signals for individually operating said motive drives to orientate their associated loop antennae into uni-directional bearing relationship with the respective radio signals.

6. A directional radio receiving system comprising two rotatable directional antennae having individual reversible motor drives; a radio frequency tuning unit connected to the winding of each of said antennae for tuning-in individual radio frequency signals; means including a local audio frequency signal source connected to each of said tuning units for modulating the tuned-in radio frequency signals with an individual control tone; means associated with said tuning units for transforming the radio frequency signals to corresponding signals having substantially the same intermediate frequency including an automatic frequency control arrangement in circuit therewith; means including circuit connections with said tuning units for jointly amplifying said intermediate frequency signals and deriving their individual control tone modulation signals; filter means for segregating the derived signals; control means selectively responsive to said segregated signals for individually operating said motor drives to orientate their associated loop antennae into uni-directional bearing relationship with the respective radio signals; and an indicator coupled with each of said rotatable antennae to indicate their bearing positions.

7. A directional radio receiving system comprising a plurality of rotatable directional antennae having individual motive drives; a radio frequency tuning unit connected to the winding of each of said antennae for tuning-in individual radio frequency signals; means including local audio frequency signal means connected to each of said tuning units for modulating the tuned-in radio frequency signals with different tone modulations; means associated with said tuning units for transforming the radio frequency signals to corresponding signals having substantially the same frequency; means including circuit connections with said tuning units for amplifying said transformed signals and for deriving their tone modulation signals; and control means selectively responsive to said different tone modulation signals for individually operating said motive drives to orientate their associated loop antennae into uni-directional bearing relationship with the respective radio signals.

8. The method of laterally guiding a vehicle which comprises non-directionally transmitting different radio carrier frequency signals from a plurality of fixed land points, separately directionally receiving and amplifying the radio signals aboard the vehicle, distinctively locally modulating the different radio signals, deriving from the modulated signals individual uni-directional bearings over 360° of arc of the vehicle with respect to the respective land points of radio transmission, and combining the derived bearings in a manner to obtain a continuous unambiguous relative position indication of the vehicle with respect to the land points.

9. The method of laterally guiding a vehicle which comprises continuously non-directionally transmitting different radio carrier frequency signals from a plurality of fixed land points, separately directionally receiving and distinctively modulating the radio signals aboard the vehicle, deriving from the modulated signals individual uni-directional bearings over 360° of arc of the vehicle with respect to the respective land points of radio transmission, and coaxially correlating the derived bearings, whereby a continuous unambiguous relative position indication of the vehicle with respect to the land points is obtained.

WILLIAM P. LEAR.